United States Patent
Cho

(10) Patent No.: US 9,371,904 B2
(45) Date of Patent: Jun. 21, 2016

(54) SHIFT CONTROL METHOD FOR DCT VEHICLE

(71) Applicants: Hyundai Motor Company, Seoul (KR); Kia Motors Corp., Seoul (KR)

(72) Inventor: Sung Hyun Cho, Yongin-Si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 39 days.

(21) Appl. No.: 14/542,585

(22) Filed: Nov. 15, 2014

(65) Prior Publication Data

US 2015/0316146 A1    Nov. 5, 2015

(30) Foreign Application Priority Data

Apr. 30, 2014   (KR) .......................... 10-2014-0052141

(51) Int. Cl.
*F16H 61/04*         (2006.01)
*F16H 61/02*         (2006.01)
*F16H 61/688*        (2006.01)

(52) U.S. Cl.
CPC ............ *F16H 61/0213* (2013.01); *F16H 61/02* (2013.01); *F16H 61/04* (2013.01); *F16H 61/688* (2013.01); *F16H 61/0403* (2013.01); *F16H 2061/0444* (2013.01); *Y10T 477/688* (2015.01); *Y10T 477/693* (2015.01); *Y10T 477/6931* (2015.01); *Y10T 477/6933* (2015.01)

(58) Field of Classification Search
CPC ..... F16H 61/0213; F16H 61/04; F16H 61/02; F16H 61/688; F16H 61/0403; Y10T 477/688; Y10T 477/693; Y10T 477/6931; Y10T 477/6933

USPC ............... 701/60, 61; 477/115, 122, 123, 124
See application file for complete search history.

(56) References Cited

U.S. PATENT DOCUMENTS

| 2004/0166990 | A1* | 8/2004 | Buchanan | ............. | B60W 10/02 |
| | | | | | 477/174 |
| 2011/0263383 | A1* | 10/2011 | Ostberg | ................ | F16H 61/688 |
| | | | | | 477/174 |
| 2013/0118850 | A1* | 5/2013 | Atmaram | ................ | F16H 61/06 |
| | | | | | 192/3.54 |
| 2015/0166039 | A1* | 6/2015 | Cho | ...................... | B60W 10/11 |
| | | | | | 701/54 |
| 2015/0167755 | A1* | 6/2015 | Yoon | ....................... | F16H 61/12 |
| | | | | | 701/53 |

FOREIGN PATENT DOCUMENTS

| JP | 2007-170559 | A | | 7/2007 |
| JP | 2008-032184 | A | | 2/2008 |
| JP | 2013-036583 | A | | 2/2013 |
| JP | 2013036479 | A | * | 2/2013 |
| JP | 2013-087800 | A | | 5/2013 |
| KR | 10-2014-0034548 | A | | 3/2014 |

* cited by examiner

*Primary Examiner* — Roger Pang
(74) *Attorney, Agent, or Firm* — Morgan, Lewis & Bockius LLP

(57) ABSTRACT

A shift control method for a dual clutch transmission (DCT) vehicle may include determining whether power-on downshift is initiated, determining a progress degree of a shift process if the power-on downshift is initiated, determining a difference in the number of shift stages between a target shift stage and a current shift stage according to the determined progress degree of the shift process, and selecting and performing one of downshifts (e.g., other shaft full-skip power-on downshift, same shaft power-on downshift, and other shaft power-on downshift) according to the progress degree of the shift process and the shift stage number difference.

11 Claims, 1 Drawing Sheet

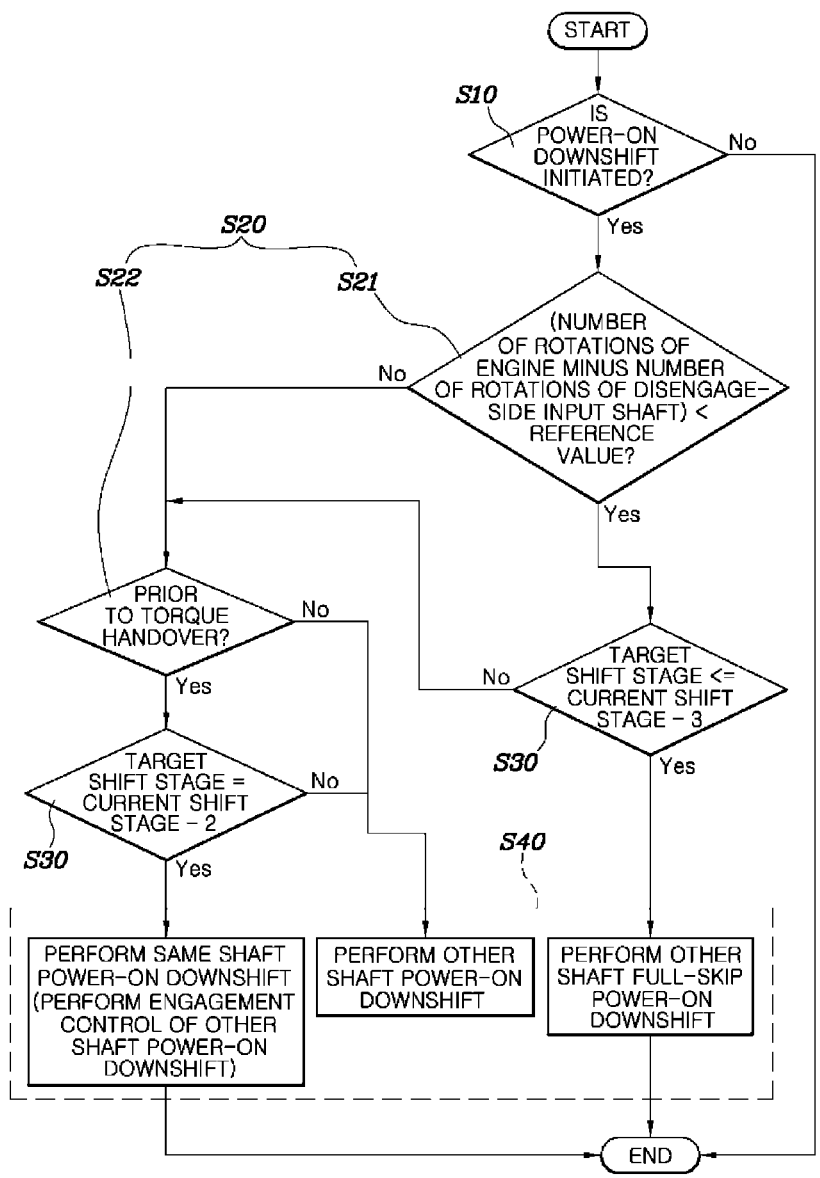

SHIFT CONTROL METHOD FOR DCT VEHICLE

CROSS REFERENCE TO RELATED APPLICATION(S)

The present application claims priority of Korean Patent Application Number 102014-0052141, filed on Apr. 30, 2014, the entire contents of which application are incorporated herein for all purposes by this reference.

BACKGROUND OF INVENTION

1. Field of Invention

The present invention relates, in general, to a shift control method for a dual clutch transmission (DCT) vehicle and, more particularly, to a technique for making it possible to secure fast shift responsiveness according to vehicle operation of a driver.

2. Description of Related Art

Dual clutch transmissions (DCTs) are designed to provide two input shafts connected to two respective clutches, to dispose shift stage gears installed on the two input shafts with the shift stage gears divided into odd and even number sides, and to functionally distinguish the two input shafts such that one of the two shafts is used for the odd number stages and the other is used for the even number stages.

Thus, the DCTs configured as described above have an advantage in that, when an arbitrary shift stage is changed to the next shift stage, the clutch connected to one input shaft for the current shift stage is disengaged, and the clutch connected to the other input shaft for the next shift stage is engaged, so that gears can be changed while torque transmitted to driving wheels in changing gear is prevented from being completely interrupted.

However, in the DCTs, a change between the shift stages disposed at the same input shaft is impossible in the way as described above. Thus, the current shift stage of the same input shaft should be changed to the shift stage of the other input shaft, and then to the other shift stage of the input shaft at which the current shift stage is again disposed.

For example, a DCT is assembled such that the input shaft for the odd number stages realizes odd number stages of first to seventh stages and that the input shaft for the even number stages realizes even number stages of second to sixth stages. When the current seventh stage, during traveling, is to be changed to the fifth stage disposed on the same input shaft, the current seventh stage should be primarily changed to the sixth stage of the even number stage input shaft, and then to the fifth stage again.

However, during the traveling of a vehicle, there occurs a need for sudden shift from the current shift stage to one of the two or more other shift stages higher or lower, rather than sequential shift. This occurs when a driver suddenly accelerates or abruptly enters an uphill incline. In this situation, the sequential shift as described above should be continuously performed several times. In this case, it takes much time to change gear, and a time for which torque is not smoothly transmitted to the driving wheels is increased. This may affect acceleration and shift performance of the vehicle, thus causing discomfort to the driver.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the related art and/or other problems, and the present invention is intended to provide a shift control method for a dual clutch transmission (DCT) vehicle capable of securing fast shift responsiveness to meet the demands of a driver in a power-on downshift condition where the driver of the DCT vehicle steps an accelerator pedal to downshift to a lower shift stage, improving acceleration performance of the vehicle and therefore satisfaction of a driver, and ultimately contributing to improving the value of the vehicle.

According to various aspects of the present invention, there is provided a shift control method for a DCT vehicle, which includes: an initiation determining step of determining whether power-on downshift is initiated; a progress determining step of determining a progress degree of a shift process if the power-on downshift is initiated; a shift stage number determining step of determining a difference in the number of shift stages between a target shift stage and a current shift stage according to the progress degree of the shift process determined in the progress determining step; and a shift performing step of selecting and performing one of other shaft full-skip power-on downshift, same shaft power-on downshift, and other shaft power-on downshift according to the progress degree of the shift process and the shift stage number difference.

According to various other aspects of the present invention, there is provided a shift control method for a DCT vehicle, which includes: determining whether power-on downshift is initiated; if the power-on downshift is initiated, determining whether the number of rotations of an engine substantially differs from the number of rotations of a disengage-side input shaft and begins to be raised if a difference between the number of rotations of the engine and the number of rotations of the disengage-side input shaft exceeds a given reference value; determining whether a difference between a target shift stage and a current shift stage is equal to or more than three stages, if the difference between the number of rotations of the engine and the number of rotations of the disengage-side input shaft is determined to be less than the reference value; and performing an other shaft full-skip power-on downshift if the difference between the target shift stage and the current shift stage is equal to or more than three stages.

According to the present invention, the shift control method for a DCT vehicle makes it possible to secure fast shift responsiveness to thus meet the demands of a driver in a power-on downshift condition where the driver of the DCT vehicle steps an accelerator pedal to downshift to a lower shift stage, to improve acceleration performance of the vehicle and therefore satisfaction of a driver, and to ultimately contribute to improving the value of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a flow chart illustrating an exemplary shift control method for a DCT vehicle according to the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a shift control method for a dual clutch transmission (DCT) vehicle according to various embodiments of the present invention includes: an initiation determining step S10 of determining whether power-on downshift is initiated; a progress determining step S20 of determining a progress degree of a shift process when the power-on downshift is initiated; a shift stage number determining step S30 of determining a difference in the number of shift stages between a target shift stage and a current shift stage according to the progress degree of the shift process determined in the progress determining step S20; and a shift performing step S40 of selecting and performing one of other shaft full-skip power-on downshift, same shaft power-on downshift, and other shaft power-on downshift according to the progress degree of the shift process and the shift stage number difference.

In detail, when the power-on downshift in which a driver steps an accelerator pedal to downshift from the current shift stage to a lower shift stage is initiated, the downshift is performed for the lower shift stage. Here, according to a progress degree of the downshift and a difference between the current shift stage and the target shift stage, one of the other shaft full-skip power-on downshift, the same shaft power-on downshift, and the other shaft power-on downshift is selected and performed.

Here, the other shaft full-skip power-on downshift means that, since the target shift stage located at an input shaft, other than an input shaft at which the current shift stage is located, has a shift stage difference of not one stage but three stages more than the current shift stage, the current shift stage is immediately changed to the target shift stage. For example, when the current shift stage is a seventh stage, first, third, and fifth stages are further located at the odd-number input shaft at which the seventh stage is located, and second, fourth, and sixth stages are located at the even-number input shaft that is the other input shaft. The other shaft full-skip power-on downshift means that the seventh stage is immediately changed to the fourth stage.

Further, the other shaft power-on downshift refers to a most typical shift process of DCT. When the current shift stage is the seventh stage disposed on the odd-number input shaft, it is changed to the sixth stage of the even-number input shaft.

Further, the same shaft power-on downshift refers to a change to another shift stage of the same input shaft. For example, when the current shift stage is the seventh stage, it is changed to the fifth stage disposed on the same odd-number input shaft. In the DCT, the basic shift is the other shaft shift as described above. In this case, the other shaft power-on downshift is continuously performed from the seventh stage to the sixth stage, and then from the sixth stage to the fifth stage.

The progress determining step S20 includes a real shift initiation determining step S21 of determining whether the number of rotations of an engine substantially differs from the number of rotations of a disengage-side input shaft and begins to be raised when a difference between the number of rotations of the engine and the number of rotations of the disengage-side input shaft is equal to or more than a given reference value, and a handover determining step S22 of determining whether torque handover for completing shift by disengaging a disengage-side clutch and engaging an engage-side clutch in a state in which the number of rotations of the engine is almost synchronized with the number of rotations of an engage-side input shaft is initiated.

Further, as a result of performing the real shift initiation determining step S21, when the difference between the number of rotations of the engine and the number of rotations of the disengage-side input shaft is less than the reference value, it is determined in the shift stage number determining step S30 whether the difference between the target shift stage and the current shift stage is equal to or more than three stages. When the difference is equal to or more than three stages, the other shaft full-skip power-on downshift is performed in the shift performing step S40.

The given reference value may be set to, for instance, 50 to 100 rpm. It is determined in the real shift initiation determining step S21 whether the number of rotations of the engine differs from the number of rotations of the disengage-side input shaft and begins to be raised when the disengage-side clutch, which is a clutch connected to a disengage-side input shaft that is an input shaft on which the current shift stage is disposed, of the two clutches of the DCT is slightly disengaged. This is because there is a possibility of lack of time to perform the other shaft full-skip power-on downshift after the shift process has considerably advanced.

That is, when the power-on downshift is initiated, the other shaft full-skip power-on downshift is typically performed. As such, the shift stage (e.g., the sixth stage), one lower than the current shift stage (e.g., the seventh stage), was engaged or is being engaged at the engage-side input shaft that is not the input shaft on which the current shift stage is disposed. In the situation in which the shift has already been initiated, even when it is determined that the target shift stage is lower by at least three stages, and that the other shaft full-skip power-on downshift is required, enough time to convert gear engagement to the fourth stage until the shift is completed by the subsequent torque handover may not be secured.

If the other shaft full-skip power-on downshift can be performed, the process in which the conventional typical other shaft power-on downshift should be continuously performed three times can be resolved with a single shift operation. As such, very fast shift responsiveness can be secured, and a driver can obtain a very good acceleration feeling.

As a result of performing the real shift initiation determining step S21, when the difference between the number of rotations of the engine and the number of rotations of the disengage-side input shaft is less than the reference value, it is determined in the shift stage number determining step S30 whether the difference between the target shift stage and the current shift stage is equal to or more than three stages. When the difference is not equal to or more than three stages, the handover determining step S22 is performed.

As a result of performing the real shift initiation determining step S21, when the difference between the number of rotations of the engine and the number of rotations of the disengage-side input shaft is more than the reference value, the handover determining step S22 is performed.

As a result of performing the handover determining step S22, when the torque handover between the engage-side clutch and the disengage-side clutch is not initiated, it is determined in the shift stage number determining step S30 whether the difference between the target shift stage and the current shift stage is two stages. When the difference is the two stages, the same shaft power-on downshift is performed in the shift performing step S40. Instead of disengaging the other shaft power-on downshift to performing shift in turn, the other shaft power-on downshift is continuously performed, or same shaft shift based on another faster method that has been previously developed is used, thereby performing the shift to the target shift stage within as fast a time as possible.

As a result of performing the handover determining step S22, even when the torque handover is not initiated, and when the difference between the target shift stage and the current shift stage is less than two stages, and as a result of performing the handover determining step S22, when the torque handover is initiated, the other shaft power-on downshift is performed in the shift performing step S40.

As described above, according to the present invention, when the power-on downshift is initiated, one of the other shaft full-skip power-on downshift, the same shaft power-on downshift, and the other shaft power-on downshift is selected and performed according to the progress degree of the shift process and the shift stage number difference between the target shift stage and the current shift stage. Thereby, the shift can be adapted to be completed as fast as possible, so that it is possible to improve the shift responsiveness and the acceleration feeling of the vehicle.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method for a dual clutch transmission (DCT) vehicle comprising:
    an initiation determining step of determining whether power-on downshift is initiated;
    a progress determining step of determining a progress degree of a shift process if the power-on downshift is initiated;
    a shift stage number determining step of determining a difference in the number of shift stages between a target shift stage and a current shift stage according to the progress degree of the shift process determined in the progress determining step; and
    a shift performing step of selecting and performing one of other shaft full-skip power-on downshift, same shaft power-on downshift, and other shaft power-on downshift according to the progress degree of the shift process and the shift stage number difference.

2. The shift control method according to claim 1, wherein the progress determining step includes:
    a real shift initiation determining step of determining whether the number of rotations of an engine substantially differs from the number of rotations of a disengage-side input shaft and begins to be raised if a difference between the number of rotations of the engine and the number of rotations of the disengage-side input shaft is equal to or more than a given reference value; and
    a handover determining step of determining whether torque handover for completing the shift by disengaging a disengage-side clutch and engaging an engage-side clutch in a state in which the number of rotations of the engine is substantially synchronized with the number of rotations of an engage-side input shaft is initiated.

3. The shift control method according to claim 2, wherein if the difference between the number of rotations of the engine and the number of rotations of the disengage-side input shaft is determined to be less than the reference value, it is determined in the shift stage number determining step whether the difference between the target shift stage and the current shift stage is equal to or more than three stages, and if the difference between the target shift stage and the current shift stage is equal to or more than three stages, the other shaft full-skip power-on downshift is performed in the shift performing step.

4. The shift control method according to claim 3, wherein if the difference between the number of rotations of the engine and the number of rotations of the disengage-side input shaft is determined to be less than the reference value, it is determined in the shift stage number determining step whether the difference between the target shift stage and the current shift stage is equal to or more than three stages, and if the difference between the target shift stage and the current shift stage is not equal to or more than three stages, the handover determining step is performed.

5. The shift control method according to claim 2, wherein if the difference between the number of rotations of the engine and the number of rotations of the disengage-side input shaft is determined to be more than the reference value, the handover determining step is performed.

6. The shift control method according to claim 4, wherein if the torque handover is not initiated, it is determined in the shift stage number determining step whether the difference between the target shift stage and the current shift stage is two stages, and if the difference the difference between the target shift stage and the current shift stage is two stages, the same shaft power-on downshift is performed in the shift performing step.

7. The shift control method according to claim 4, wherein if the torque handover is not initiated and the difference between the target shift stage and the current shift stage is less than the two stages, or if the torque handover is initiated, the other shaft power-on downshift is performed in the shift performing step.

8. A shift control method for a dual clutch transmission (DCT) vehicle comprising:
    determining whether power-on downshift is initiated;
    if the power-on downshift is initiated, determining whether the number of rotations of an engine substantially differs from the number of rotations of a disengage-side input shaft and begins to be raised if a difference between the number of rotations of the engine and the number of rotations of the disengage-side input shaft exceeds a given reference value;
    determining whether a difference between a target shift stage and a current shift stage is equal to or more than three stages, if the difference between the number of rotations of the engine and the number of rotations of the disengage-side input shaft is determined to be less than the reference value; and performing an other shaft full-skip power-on downshift if the difference between the target shift stage and the current shift stage is equal to or more than three stages.

9. The shift control method according to claim 8, wherein if the difference between the number of rotations of the engine and the number of rotations of the disengage-side input shaft exceeds the reference value, or if the difference between the target shift stage and the current shift stage is less than three stages even if the difference between the number of rotations of the engine and the number of rotations of the disengage-side input shaft is less than the reference value, the method further comprises:

determining whether torque handover for completing shift by disengaging a disengage-side clutch and engaging an engage-side clutch in a state in which the number of rotations of the engine is substantially synchronized with the number of rotations of an engage-side input shaft is initiated.

10. The shift control method according to claim 9, wherein if the torque handover is not initiated, the method further comprises:

determining whether the difference between the target shift stage and the current shift stage is two stages; and performing a same shaft power-on downshift if the difference between the target shift stage and the current shift stage is the two stages.

11. The shift control method according to claim 9, wherein if the torque handover is not initiated and the difference between the target shift stage and the current shift stage is less than the two stages, or if the torque handover is initiated, the method further comprising:

performing an other shaft power-on downshift.

* * * * *